(12) United States Patent
Kallio et al.

(10) Patent No.: US 8,605,648 B2
(45) Date of Patent: Dec. 10, 2013

(54) VIDEO TRAFFIC IN A COMMUNICATIONS SYSTEM

(75) Inventors: Juha Kallio, Helsinki (FI); Markku Jylha-Ollila, Helsinki (FI)

(73) Assignee: Nokia Corporation, Espoo (FI)

( * ) Notice: Subject to any disclaimer, the term of this patent is extended or adjusted under 35 U.S.C. 154(b) by 1283 days.

(21) Appl. No.: 11/157,795

(22) Filed: Jun. 22, 2005

(65) Prior Publication Data

US 2006/0187903 A1 Aug. 24, 2006

(30) Foreign Application Priority Data

Feb. 18, 2005 (GB) .................................. 0503437.6

(51) Int. Cl.
*H04W 4/00* (2009.01)

(52) U.S. Cl.
USPC ........ 370/328; 370/329; 455/445; 455/452.1; 455/452.2

(58) Field of Classification Search
USPC ......... 455/445, 452.1, 452.2, 395.43, 395.64, 455/395.61, 468; 370/395.43, 395.64, 370/395.61, 468, 328, 329
See application file for complete search history.

(56) References Cited

U.S. PATENT DOCUMENTS

| | | | |
|---|---|---|---|
| 6,504,839 B2 * | 1/2003 | Valentine et al. | 370/354 |
| 6,678,524 B1 * | 1/2004 | Hansson et al. | 455/445 |
| 7,061,894 B2 * | 6/2006 | Pang et al. | 370/338 |
| 7,280,546 B1 * | 10/2007 | Sharma et al. | 370/401 |
| 7,286,468 B2 * | 10/2007 | Scudder et al. | 370/219 |
| 7,313,153 B2 * | 12/2007 | Sugaya | 370/468 |
| 7,366,192 B2 * | 4/2008 | Jabri et al. | 370/410 |
| 2003/0169751 A1 * | 9/2003 | Pulkka et al. | 370/401 |
| 2004/0078468 A1 * | 4/2004 | Hedin et al. | 709/227 |
| 2004/0218586 A1 * | 11/2004 | Khoury et al. | 370/352 |
| 2005/0047399 A1 * | 3/2005 | Lee et al. | 370/352 |
| 2006/0109837 A1 * | 5/2006 | Saha et al. | 370/352 |
| 2007/0165598 A1 * | 7/2007 | Hynonen et al. | 370/352 |

FOREIGN PATENT DOCUMENTS

WO WO 0103461 A1 * 1/2001 ............... H04Q 7/38

OTHER PUBLICATIONS

3GPP TSG SA: Digital Cellular Telecommunications System (Phase 2+); Universal Mobile Telecommunications System (UMTS); Architecture Requirements for Release 99 (3GPP TS 23.121 version 3.6.0 Release 1999; Jun. 2002; pp. 1-57.

(Continued)

*Primary Examiner* — Amancio Gonzalez
(74) *Attorney, Agent, or Firm* — Mintz, Levin, Cohn, Ferris, Glovsky & Popeo, P.C.

(57) ABSTRACT

A communications system for conveying traffic of first and second types comprising: a first network entity being arranged to receive a request from a calling party to establish a communication channel for traffic to a called party identified in the request, the first network entity having means for determining a type of traffic identified in the request and for routing the request to the called party if the request is for traffic of a first type, and means for redirecting the request if the request is for traffic of a second type; and a second network entity arranged to receive the redirected request and having means for routing the request to the called party whereby a channel for traffic of the second type can be established via the second network entity.

17 Claims, 4 Drawing Sheets

Network architecture

(56) References Cited

OTHER PUBLICATIONS

3GPP S2: "Report on Alternative Architectures for Combining CS Bearers with IMS; TR 23.899 V1.0.0 Release 6" 3GPP Technical Specification; Dec. 2004; pp. 1-52.

3GPP TSG: Digital Cellular Telecommunications System (Phase 2+); Universal Mobile Telecommunications System (UMTS); Mobile Radio Interface Layer 3 Specification; Core Network Protocols; Stage 3 (3GPP TS 24.008 version 6.7.0 Release 6); ETSI TS 124 008; Jan. 2005; pp. 1-508.

3GPP TSG CN: Universal Mobile Telecommunications System (UMTS); Circuit Switched Multimedia Telephony (3G TR 23.972 version 3.0.0 Release 1999); ETSI TR 123 972; Mar. 2000; pp. 1-17.

Orr E: "Understanding the 3G-324M Spec: Part 2"; Internet Citation; Jan. 28, 2003, pp. 1-4.

\* cited by examiner

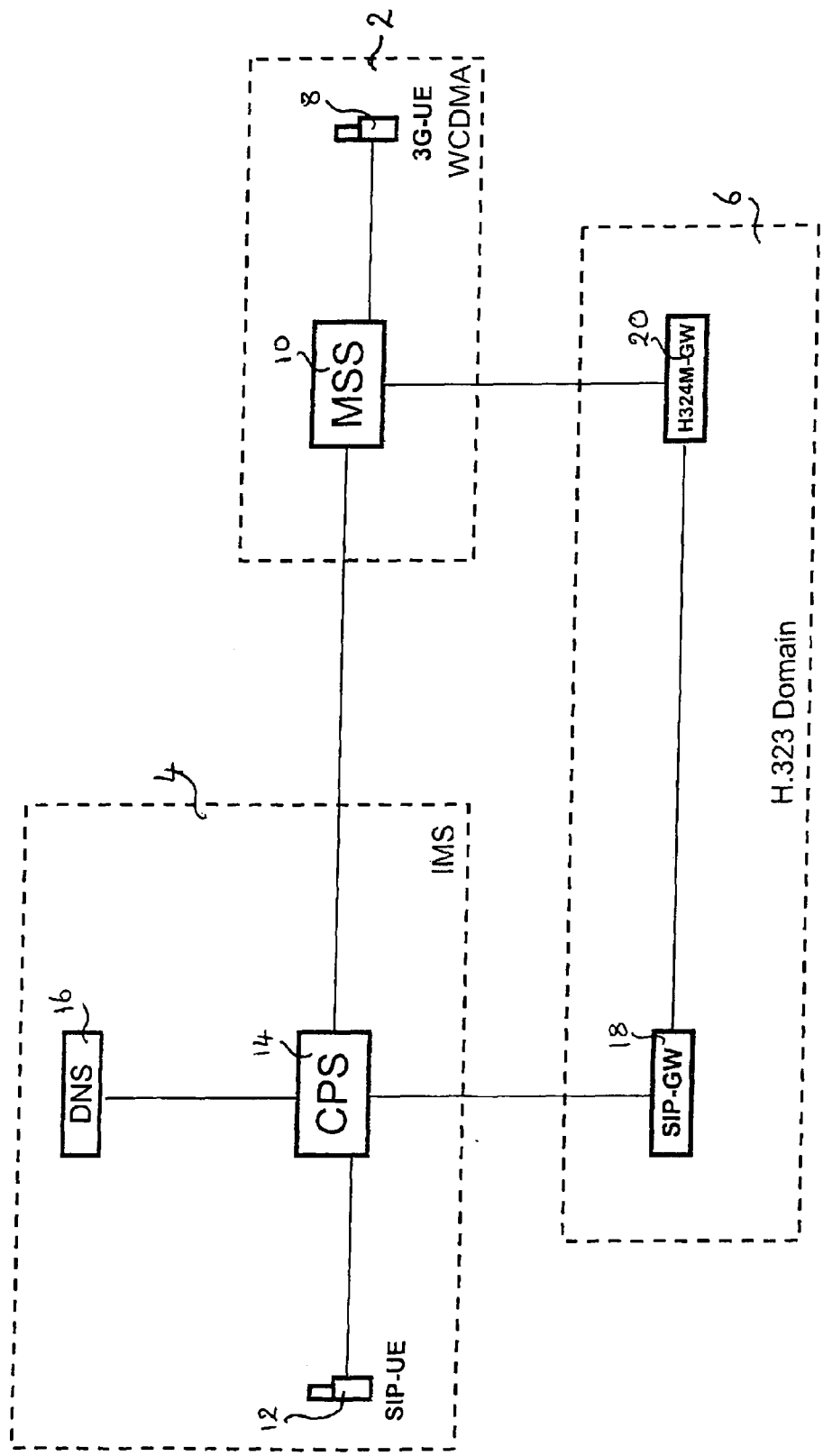
figure 1. Network architecture

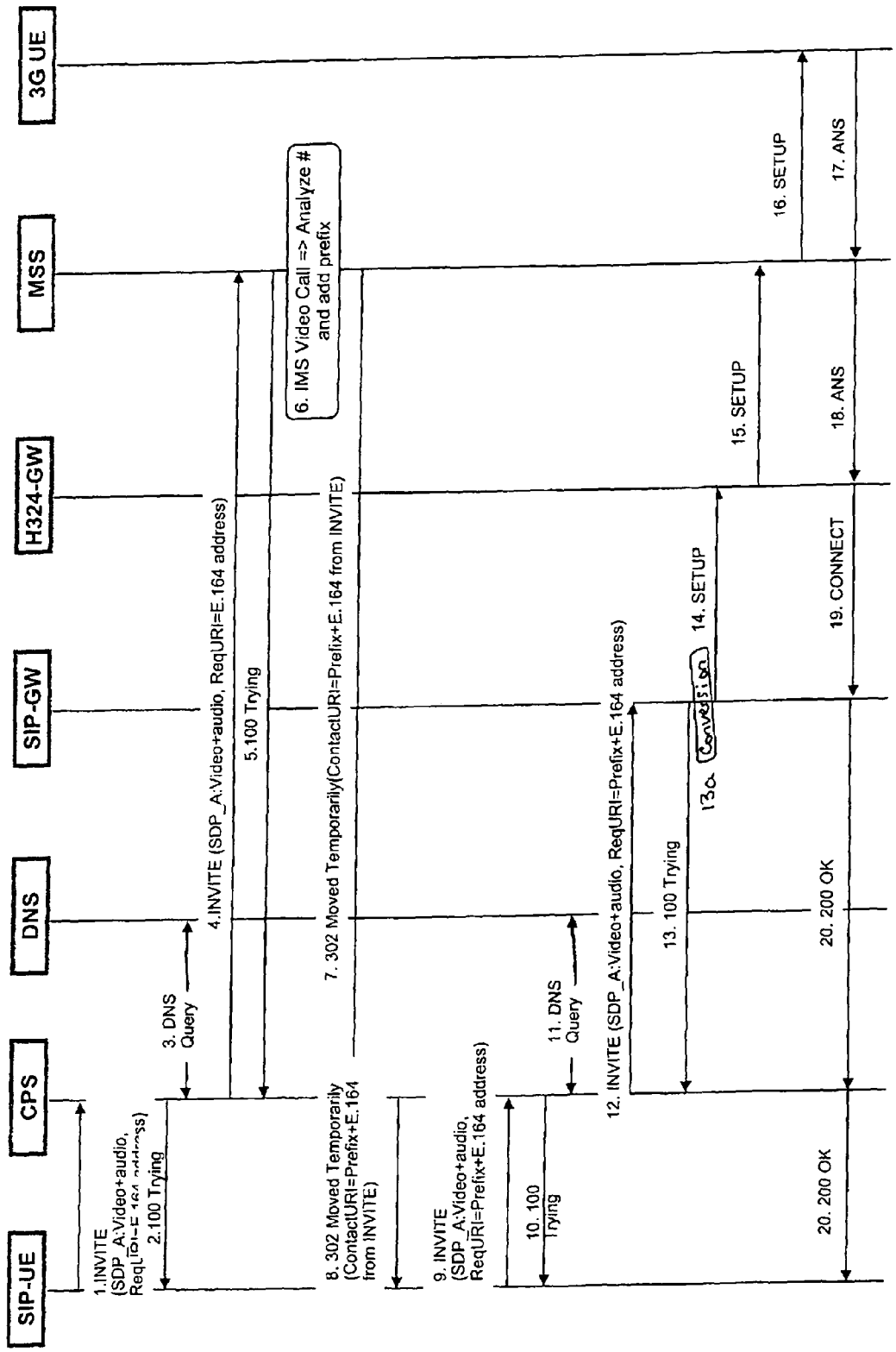

VIDEO TRAFFIC IN A COMMUNICATIONS SYSTEM

BACKGROUND OF THE INVENTION

Field of the Invention

The present invention relates to video traffic in a communications system, particularly but not exclusively to a system supporting packet switched and circuit switched wireless networks.

SUMMARY OF THE INVENTION

Communications systems providing wireless communication for user equipment are known. An example of a wireless system is the public land mobile network (PLMN). PLMNs are commonly based on cellular technology. In cellular systems, a base transceiver station (BTS) or some other access entity services mobile user equipment (UE) via a wireless interface between these entities. A communication on the wireless interface between the user equipment and element of the communication network can be based on an appropriate communication protocol. The operation of the base station apparatus and other apparatus required for the communication can be controlled by one or several control entities.

One or more gateway nodes may be provided for connecting the cellular access network to other networks, for example to a public switched telephone network (PSTN) and/or other communication networks such as an IP (Internet Protocol) and/or other packet switched data networks. In such arrangements, a mobile communications network provides an access network enabling a user with wireless user equipment to access external networks, hosts or services being offered by specific service providers.

A network which is commonly implemented is the IP multimedia call network subsystem (IMS). The IMS includes various network entities for the provision of multimedia services. IMS services are intended to offer, amongst other services, IP based packet data communication sessions between mobile user equipment. The IMS domain commonly supports a session initiation protocol (SIP) as developed by the Internet Engineering Task Force (IETF). Session initiation protocol (SIP) is an application layer packet based protocol for creating, modifying and terminating sessions with one or more participants (end points). A user connected to an SIP communications system may communicate with various entities of the communications system based on standardised SIP messages. These messages are laid down according to RFC (Request for Comments) 822.

A gateway node which is available for accessing the existing cellular access network is the H.324M-gateway. 3G-324M-video telephony is one of the new emerging services in the third generation (3G) communications system. The 3G-324M protocol operates over an established circuit switched connection between two communicating terminals, and allows multimedia communication over circuit switched networks. It has been adopted by the third generation partnership project (3GPP) and is based on the International Telecommunications Union (ITU) H.324M specification for multimedia conferencing over CS networks. One of the possibilities it offers is to make a video call between two 3G terminals. Such video calls are termed herein circuit switched video calls because they are provided in real time across a circuit switched network.

Another gateway node which is available is a SIP gateway node which allows video calls to be made between SIP terminals and 3G-324M terminals. The SIP gateway acts as a mediator between the two domains.

At the moment, 3G terminals can make a video call to an SIP terminal using the existing communications architecture, including the H.324M gateway and the SIP gateway. However, it is not possible for an SIP terminal to make a video call to a 3G terminal. In an existing communications system, when an SIP terminal seeks to make a video call to a 3G terminal, a request is dispatched towards a network entity in the 3G network in the form of a mobile switching centre (MSC) server. The MSC server recognises the type of call (speech or video), and if it is a speech call routes it to the 3G terminal over the radio access network (RAN) infrastructure. However, if the call type is recognised as a video call, it is teared down at the MSC server because there is no means to provide interworking between the SIP packet based video session and circuit switched H.324M based video calls.

It is an aim of the present invention to allow such calls to be implemented without affecting the existing SIP IETF standard protocols and in such a manner as to be compatible with existing 3GPP standards.

According to one aspect of the present invention there is provided a communications system for conveying traffic of first and second types comprising: a first network entity being arranged to receive a request from a calling party to establish a communication channel for traffic to a called party identified in the request, the first network entity having means for determining a type of traffic identified in the request and for routing the request to the called party if the request is for traffic of a first type, and means for redirecting the request if the request is for traffic of a second type; and a second network entity arranged to receive the redirected request and having means for routing the request to the called party whereby a channel for traffic of the second type can be established via the second network entity.

Another aspect provides a method of conveying traffic of first and second types in a communications system, the method comprising: receiving a request from a calling party to establish a communications channel for traffic to a called party identified in the request; determining a type of traffic identified in the request; routing the request to the called party via a first route if the request is for traffic of a first type; and routing the request to the called party via a second route if the request is for traffic of a second type, the second route including at least one network entity for handling traffic of the second type.

A further aspect provides a network entity in a communications system being arranged to receive a request from a calling party to establish a communication channel for traffic to a called party identified in the request, the first network entity comprising means for determining a type of traffic identified in the request; means for routing the request to the called party if the request is for traffic of a first type; and means for redirecting the request if the request if for traffic of a second type.

BRIEF DESCRIPTION OF THE DRAWINGS

For a better understanding of the present invention and to show how the same may be carried into effect, reference will now be made by way of example to the accompanying drawings in which:

FIG. 1 is a schematic diagram of a network architecture;

FIG. 2 illustrates the sequence of steps in establishing a video call;

DETAILED DESCRIPTION OF THE PREFERRED EMBODIMENTS

Figure 3A:
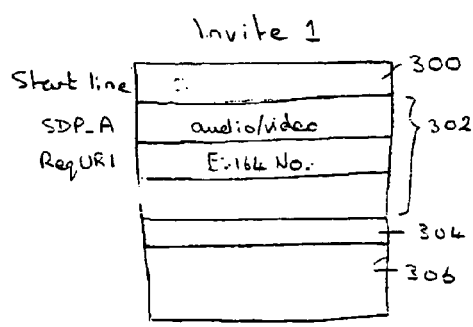
FIGS. 3A, 3B, and 3C show formats of SIP messages.

FIG. 1 illustrates schematically a network architecture within which an embodiment of the present invention can be implemented. The architecture does not illustrate all of the intermediate gateways and elements of a communications system, but describes the important entities for implementing an embodiment of the invention. A wireless network 2 is shown connected to an IP (internet protocol) multimedia call network subsystem (IMS) 4. The wireless network 2 and the IP multimedia call network subsystem 4 are connected to an H.323 domain 6. The wireless network 2 in the illustrated embodiment is a wideband code division multiplexed access (W-CDMA) network but is illustrated herein as one example of a circuit switched (CS) wireless network. The IMS 4 is illustrated herein as an example of a packet switched (PS) network. It will readily be appreciated that the invention can be implemented with other circuit switched and packet switched networks.

The wireless network 2 is shown including a single terminal in the form of user equipment 8 which is labelled 3G-UE to denote that it is a user equipment operating according to the third generation wireless standard. It is connected to a mobile switching centre (MSC) server system MSS 10 in the circuit switched network 2.

The IP multimedia call network subsystem (IMS) 4 is shown to include a single terminal in the form of user equipment 12 which is labelled herein SIP-UE to show that it implements a session initiation protocol (SIP). In line with SIP terminology, the terminals are sometimes referred to herein as endpoints. User equipment or users that run certain applications on the user equipment are registered with an SIP backbone so that an invitation to a particular session can be correctly delivered to these end points. The SIP terminal 12 is connected to a connection processing server CPS 14. The connection processing server 14 communicates with a domain name server DNS 16 whose function is to provide address resolution. That is, the address in the ReqURI is converted to the real IP-address by making a DNS query. The IMS 4 is connected to the H.323 domain 6 via an SIP gateway (SIP-GW) 18 which performs protocol conversion between SIP protocol and H.323 protocol suite. This is connected to an H.324M gateway 20 in the H.323 domain which itself is connected to the MSC server system 10 in the radio network 2.

It will be appreciated that the user equipment can take any appropriate form, in particular a mobile phone, personal computer (PC), personal digital assistant (PDA), etc. The user equipment includes transmitter and receiver circuitry for establishing wireless channels for communication with the relevant network, and processor means for establishing calls according to protocols supported in the terminals.

FIG. 2 illustrates the sequence of events which occurs when the SIP user equipment 12 seeks to establish a video call with the 3G-user equipment 8. In the following, reference is made to standard SIP messages which can be found in RFC 822. They are identified in the following by their name and Standards number. As is well known, SIP messages are divided into requests and responses, each having a preset protocol. The only request which is discussed in the following is an Invite request. Various responses are discussed, each identified by their particular number and name.

According to step 1, an invite message Invite 1 is established from the SIP terminal 12 to the connection processing server 14 in accordance with established SIP protocol. An invite message is initiated by the calling party and is used to ask parties to join a call. As shown in FIG. 3A, the message format includes a start line 300, one or more header fields 302, an empty line 304 and an optional message body 306. In implementation, each line ends with a carriage return line feed. The header fields include an FDP_A field which identifies the type of call, in this case that it is a video and audio call and a ReqURI field which holds an E.164 number identifying the called party. The ReqURI field thus holds a universal resource identifier in accordance with the E.164 standard. E.164 is an international numbering plan defined by ITU-T Recommendation E.164. Recommendation E.164 provides the number structure and functionality for numbers used for International public telecommunication. All telephone numbers can be called if a number is dialled of up to fifteen digits, made up of a one to three digit country code (CC), followed by the subscriber number (SN). The first few digits of the subscriber number can be a so-called National Destination Code (NDC), which can identify the type of telephone number being called. All country codes are assigned by ITU in Recommendation E.164. For instance a mobile number in Finland +358405001574 is an E.164 number where 358 is country code (CC) for Finland, 40 is the National Destination Code (NDC) and 5001574 is the subscriber number (SN).

In accordance with step 2, the CPS 14 returns a response 100, a "trying" message which indicates that a request has been initiated by the calling party but the called party has not yet been located.

According to step 3, a DNS query is dispatched to the DNS 16 to provide address resolution. The DNS provides the real IP address needed to send an Invite to the correct physical destination.

The CPS 14 issues an Invite message to the MSS 10 which once again includes the SDP_A field identifying that this is a video and audio call, and the ReqURI field identifying the E.164 address of the calling party. The MSS 10 returns a Trying message as indicated at step 5.

Figure 3B:
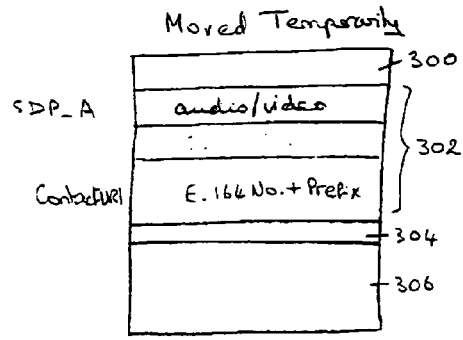
Figure 4:
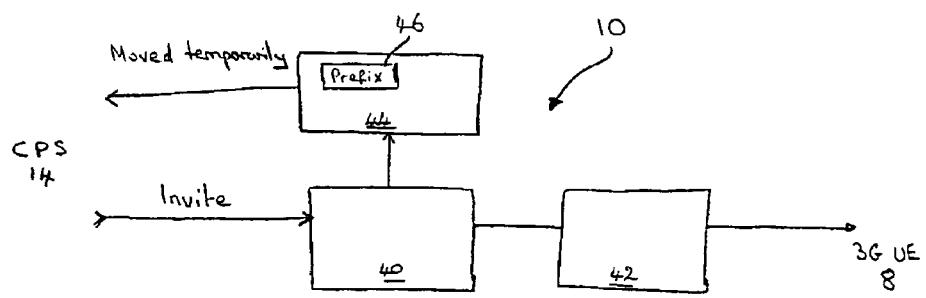
FIG. 4 is a schematic block diagram of functional components of the MSS.

MSS 10 then proceeds to analyse the invite message Invite 1. As shown in FIG. 4, the MSS includes a determining entity 40 which determines the type of call, that is whether it is speech or video. A routing entity 42 is connected to the output of the determining entity 40 and if it is determined that it is a speech call, the routing entity 42 routes the call directly to the called 3G terminal 8 in accordance with known practice. If it identifies that the Invite request corresponds to a video call type, a redirect entity 44 in the MSS 10 adds a prefix 46 to the E.164 address held in the ReqURI field and the contact URI field is set to the prefixed E.164 address which is allocated to the Invite message by the MSS 10. The prefix can be a simple number like 50 that identifies the SIP gateway. The MSS 10 formulates an SIP message 302 (Moved Temporarily to the Calling Party) which is illustrated in FIG. 3B. This message indicates that the called party is temporarily unavailable, and an alternate location should be included in the header. The SIP message 302 currently exists for call redirection purposes. It includes a contact URI field for holding the alternate location, so the prefixed E.164 address is held there.

Figure 3C:
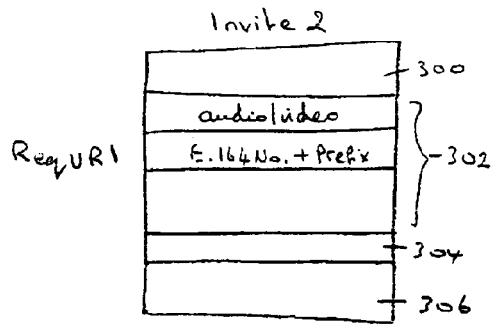

As indicated in step 8, the connection processing server 14 returns the SIP message 302 to the calling party 12. In accordance with normal redirect procedure, a calling party 12 now issues a new Invite message Invite 2 as shown in step 9 with the SDP_A field set to video and audio, and the ReqURI field now holding the new contact location, namely the prefix and the E.164 address (see FIG. 3C).

An SIP 100 message Trying is returned from the CPS 14 as shown in step 10. At the same time the CPS 14 sets up a query to the DNS 16 as shown in step 11. Assuming that the address resolution for the prefixed address is satisfactory, the CPS establishes an Invite message including the prefix E.164 address to the SIP gateway 18. The SIP gateway 18 returns an SIP 100 message trying to the CPS 14 as shown in step 13, and also performs a conversion from the SIP protocol to the H.323 protocol as shown by step 13a. SIP protocol is converted to H.323 messages (which are Q.931 type of call control messages and H.245 control messages sent inside the H323 domain). In the described embodiment of this invention, when this conversion is effected the prefix is removed and the existing E.164 address is read so that the call is routed to the H.324M gateway 20 and from there to the called party 8. This is shown in FIG. 2 by the setup requests labelled 14, 15 and 16. A response is sent from the called party 8 to the MSS 10 (step 17) which similarly returns a response to the H.324M gateway 20 (step 18). This allows the H.324M gateway 20 to connect to the SIP gateway 18 to continue the SIP session which was initiated when the Invite was received from CPS to SIP gateway. The SIP gateway 18 accordingly dispatches an SIP 200 okay message indicating that the request has been successfully processed.

Figure 5:
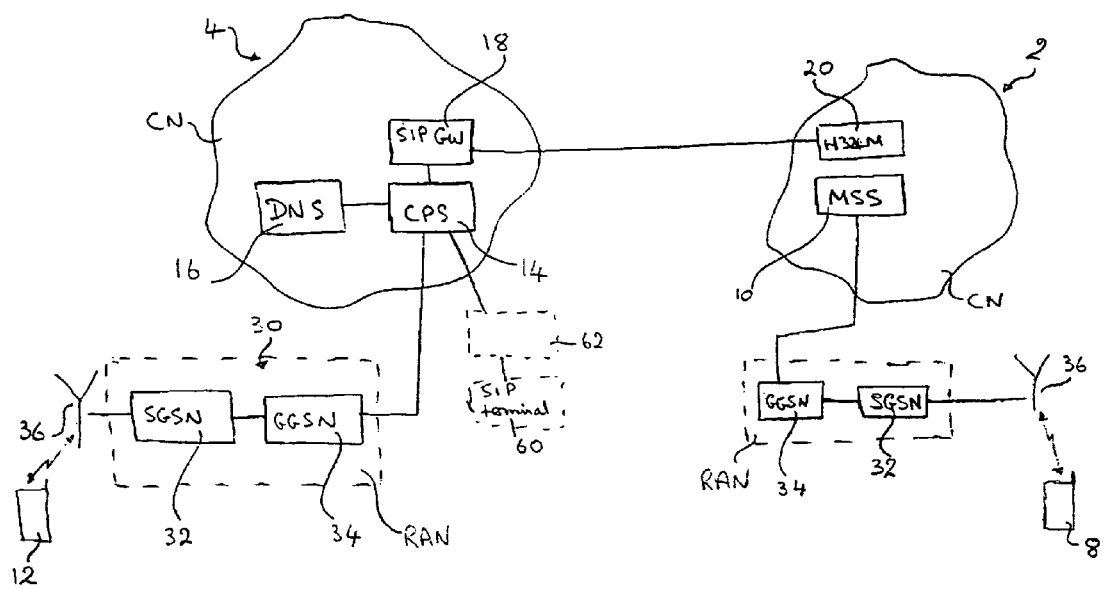
FIG. 5 is a diagram illustrating IMS and circuit switched calls.

FIG. 5 is a schematic diagram illustrating in more detail the architecture of a mobile communications network supporting IMS and circuit switched calls. FIG. 5 shows the radio network 2 divided into a call network CN and a radio access network RAN. The call network entities typically include various control entities and gateways for enabling the communication via a number of radio access networks and also for interfacing a single communications system with one or more communications system such as with other cellular systems and/or fixed line communications systems. In this case the call network CN includes the MSC server system 10 and the H.324M gateway 20. The MSS is connected to the RAN over the Iu-CS interface. The radio access network for the IMS side includes a GPRS backbone which includes a number of service nodes which are referred to herein as serving GPRS support nodes (SGSN). One of these 32 is shown connected to the call network CN via a general GPRS support node (GGSN) 34.

It will readily be appreciated that while FIG. 5 shows a wireless SIP user equipment, and the existing IMS network supports such equipment, a SIP terminal may also be non-wireless as denoted by reference numeral 60 in which case it communications with the CPS 14 via a suitable server or other network arrangement 62.

It will be appreciated that the difference which is implied herein between the 3G-UE and the SIP-UE is that the former supports circuit switched video and the second supports packet switched video. The mechanism by which the packet switched data is transferred (i.e. wireless as opposed to non-wireless) is not important.

The invention claimed is:

1. A system, comprising:
a first network entity coupled to an H.324 gateway and a called party, the first network entity configured to receive a request from a calling party to establish a communication channel for traffic with the called party identified in the request, to determine a type of the traffic identified in the request, to route the request to the called party when the request is for a first type of the traffic, and to redirect the request when the request is for a second type of the traffic, the first type comprising speech-type, circuit switched traffic and the second type comprising multimedia, packet switched traffic including a video call type not supported at the first network entity without conversion, the calling party sending the request over a packet switched network in accordance with a session initiation protocol to the first network entity, wherein the first network entity comprises a mobile switching center server system, wherein the mobile switching center server system redirects the request to a session initiation protocol gateway when the request is for the second type; and
a second network entity coupled to the session initiation protocol gateway and the calling party, wherein the H.324 gateway and the session initiation protocol gateway are coupled to enable communication in accordance with an H.323 protocol, the second network entity configured to receive the redirected request when the redirected request is of the second type, to convert the redirected request from the session initiation protocol to another protocol supported by the first network entity.

2. A system according to claim 1, wherein a communication between the first network entity and the second network entity is wireless.

3. A system according to claim 1, wherein the second type of the traffic identified in the request according to a first protocol and the second network entity translates the first protocol into a second protocol to establish the channel.

4. A system according to claim 1, further comprising:
a third network entity between the second network entity and the called party configured to handle the second type of the traffic.

5. A system according to claim 1, wherein the first network entity redirects the request by adding a prefix identifying the session initiation protocol gateway to the request.

6. A system according to claim 5, wherein the second network entity removes the prefix identifying the session initiation protocol gateway.

7. A method, comprising:
receiving a request from a calling party to establish a communication channel for traffic with a called party identified in the request;
determining a type of the traffic identified in the request;
routing the request to the called party via a first route when the request is for a first type of the traffic;
routing the request to the called party via a second route when the request is for a second type of the traffic, the first type comprising speech-type, circuit switched traffic and the second type comprising multimedia, packet switched traffic including a video call type not supported at a network entity without conversion; and
handling the second type of the traffic via the second route using a first network entity coupled to an H.324 gateway, the called party and a second network entity coupled to a session initiation protocol gateway and the calling party, wherein the H.324 gateway and the session initiation protocol gateway are coupled to enable communication in accordance with an H.323 protocol,
wherein the first network entity comprises a mobile switching center server system, wherein the mobile switching center server system redirects the request to the session initiation protocol gateway when the request is for the second type.

8. A method according to claim 7, wherein the second type of the traffic is video.

9. A method according to claim 7, wherein the establishment of said communication channel comprises a wireless communication.

10. A method according to claim 7, wherein the routing of the request to the called party via the second route comprises reading a prefix in the request identifying the session initiation protocol gateway using the prefix, and removing the prefix.

11. An apparatus, comprising:
a receiver configured to receive a request from a calling party to establish a communication channel for traffic with a called party identified in the request;
a determiner configured to determine a type of the traffic identified in the request;
a router configured to route the request to the called party when the request is for a first type of the traffic of a first type; and
a redirector configured to redirect the request to the called party via a second route when the request is for a second type of the traffic, the first type comprising speech-type, circuit switched traffic and the second type comprising multimedia, packet switched traffic including a video call type not supported at the apparatus without conversion, the second route comprising:
a first network entity coupled to an H.324 gateway and the called party; and
a second network entity coupled to a session initiation protocol gateway and the calling party, wherein the H.324 gateway and the session initiation protocol gateway are coupled to enable communication in accordance with an H.323 protocol,
wherein the first network entity comprises a mobile switching center server system, wherein the mobile switching center server system redirects the request to the session initiation protocol gateway when the request is for the second type.

12. An apparatus according to claim 11, wherein the apparatus comprises the mobile switching center server system.

13. An apparatus according to claim 11, wherein the redirector further comprises a reader configured to read a prefix in the request identifying the session initiation protocol gateway and to remove the prefix from the request, the prefix identifying the second network entity.

14. An apparatus according to claim 11, wherein the first type of the traffic is speech and the second type of the traffic is video.

15. A method, comprising:
receiving a request from a calling party to establish a communication channel for traffic with a called party identified in the request;
determining a type of the traffic identified in the request;
routing the request to the called party via a first route when the request is for a first type of the traffic; and
redirecting the request to the called party via a second route when the request is for a second type of the traffic, wherein at least one of the receiving, the determining, the routing, and the redirecting are performed by a network element, the first type comprising speech-type, circuit switched traffic and the second type comprising multimedia, packet switched traffic including a video call type not supported at the network element without conversion, the second route comprising:
a first network entity coupled to an H.324 gateway and the called party; and
a second network entity coupled to a session initiation protocol gateway and the calling party, wherein the H.324 gateway and the session initiation protocol gateway are coupled to enable communication in accordance with an H.323 protocol,
wherein the first network entity comprises a mobile switching center server system, wherein the mobile switching center server system redirects the request to the session initiation protocol gateway when the request is for the second type.

16. A method according to claim 15, wherein the redirecting further comprises reading a prefix in the request identifying the session initiation protocol gateway and removing the prefix from the request, the prefix identifying the second network entity.

17. A method according to claim 15, wherein the first type of the traffic is speech and the second type of the traffic is video.

* * * * *